(12) United States Patent
Pfau et al.

(10) Patent No.: US 9,500,791 B2
(45) Date of Patent: Nov. 22, 2016

(54) GRADIENT LIGHT HALO FOR A REMOTE INPUT DEVICE

(71) Applicants: Douglas Allen Pfau, Canton, MI (US); Andrew DeSisciolo, Canton, MI (US)

(72) Inventors: Douglas Allen Pfau, Canton, MI (US); Andrew DeSisciolo, Canton, MI (US)

(73) Assignee: Visteon Global Technolgoies, Inc., Van Buren Township, MI (US)

( * ) Notice: Subject to any disclaimer, the term of this patent is extended or adjusted under 35 U.S.C. 154(b) by 239 days.

(21) Appl. No.: 14/492,734

(22) Filed: Sep. 22, 2014

(65) Prior Publication Data

US 2016/0085012 A1    Mar. 24, 2016

(51) Int. Cl.
  *F21V 8/00*    (2006.01)
  *G06F 3/042*    (2006.01)
  *G06F 3/0354*    (2013.01)

(52) U.S. Cl.
  CPC .......... *G02B 6/0005* (2013.01); *G06F 3/03547* (2013.01); *G06F 3/042* (2013.01); *G02B 6/0006* (2013.01); *G02B 6/0045* (2013.01)

(58) Field of Classification Search
  CPC  G02B 6/0005; G02B 6/0006; G02B 6/0045; G06F 3/042; G06F 3/03547
  USPC .......... 362/551, 559, 511, 489, 23.01, 23.09, 362/23.12, 23.13, 23.16, 23.19, 23.2
  See application file for complete search history.

(56) References Cited

U.S. PATENT DOCUMENTS

| | | | |
|---|---|---|---|
| 6,074,077 A | 6/2000 | Pastrick et al. | |
| 7,798,091 B2* | 9/2010 | Suita | B60K 37/02 116/287 |
| 8,172,097 B2 | 5/2012 | Nearman et al. | |
| 8,540,403 B2* | 9/2013 | Komuro | H04M 1/22 362/249.02 |
| 2014/0233208 A1* | 8/2014 | Hamada | B60K 37/02 362/23.17 |
| 2014/0254187 A1* | 9/2014 | Massault | B32B 17/10036 362/511 |

* cited by examiner

*Primary Examiner* — Laura Tso
(74) *Attorney, Agent, or Firm* — Dickinson Wright PLLC

(57) ABSTRACT

A gradient light halo device gradient light halo device for creating a gradient light halo for a remote input device is disclosed herein. The device includes a backlight portion to project a backlight onto a first surface of a remote input device; a floodlight portion to project a floodlight onto a second surface of the remote input device, the second surface opposing the first surface; an ink layer disposed on the first surface, the ink layer including a solid portion and a stippled portion; and a blocking layer disposed on the second surface, the blocking layer including a non-ink portion and an ink portion. A method of creating a gradient light halo is also disclosed, as well as a method of manufacturing a gradient light halo assembly.

14 Claims, 5 Drawing Sheets

GRADIENT LIGHT HALO FOR A REMOTE INPUT DEVICE

BACKGROUND

Electronic displays are conventionally implemented to provide information and visual cues to observers. The electronic displays receive information from a source, such as a broadcast signal, a processor, a display driver, or the like—and transform light to render text, images, or videos.

Throughout the years, different electronic techniques have been developed and implemented to achieve electronic displays. For example, early electronic displays were implemented via cathode ray tubes (CRT) or projection based displays. In recent years, electronic displays incorporating various diode or light emitting displays have been realized.

Additionally, electronic displays have been integrated with touch technology. Thus, in addition to providing display capabilities, the electronic displays have been augmented with an ability to engage with a system via a touchscreen. The touchscreen employs various technologies (for example, capacitive or resistive touching), to provide an engage-able display area. Thus, various indicia, such as icons or graphical user interfaces (GUI), may be provided to a user in an efficient and interactive manner.

In the field of consumer electronics, electronic displays are provided and improved upon by adding technology to improve the display quality. For example, resolution or frequency may be improved or increased. By providing a more detailed, sharper, or vibrant presentation, the electronic display may be more aesthetically pleasing to a potential customer. However, several of these improvements may be costly, and require severe modifications to an underlying lighting technology (for example, modifying the device physics or semiconductor architecture associated with a lighting device).

In many instances the displays may be out of a comfortable reach of the end user, or may retain finger prints that can be unappealing to the end user. For these reasons there has also been another set of devices developed as inputs to the display remotely located away from the display. The remote input devices may be comprised of a series of buttons, a rotary know, a jog dial, a touchpad or any combination of the above mentioned devices. In many cases these remote input devices are aided when placed in areas of lower light or when the overall assembly may be in the dark.

SUMMARY

A gradient light halo device is disclosed herein. The device includes a backlight portion to project a backlight onto a first surface of a remote input device; a floodlight portion to project a floodlight onto a second surface of a remote input device, the second surface opposing the first surface; an ink layer disposed on the first surface, the ink layer including a solid portion and a stippled portion; and a blocking layer disposed on the second surface, the blocking layer including a non-ink portion and an ink portion. A method of creating a gradient light halo is also disclosed, as well as a method of manufacturing a gradient light halo assembly.

DESCRIPTION OF THE DRAWINGS

The detailed description refers to the following drawings, in which like numerals refer to like items, and in which.

DETAILED DESCRIPTION

Figure 1:
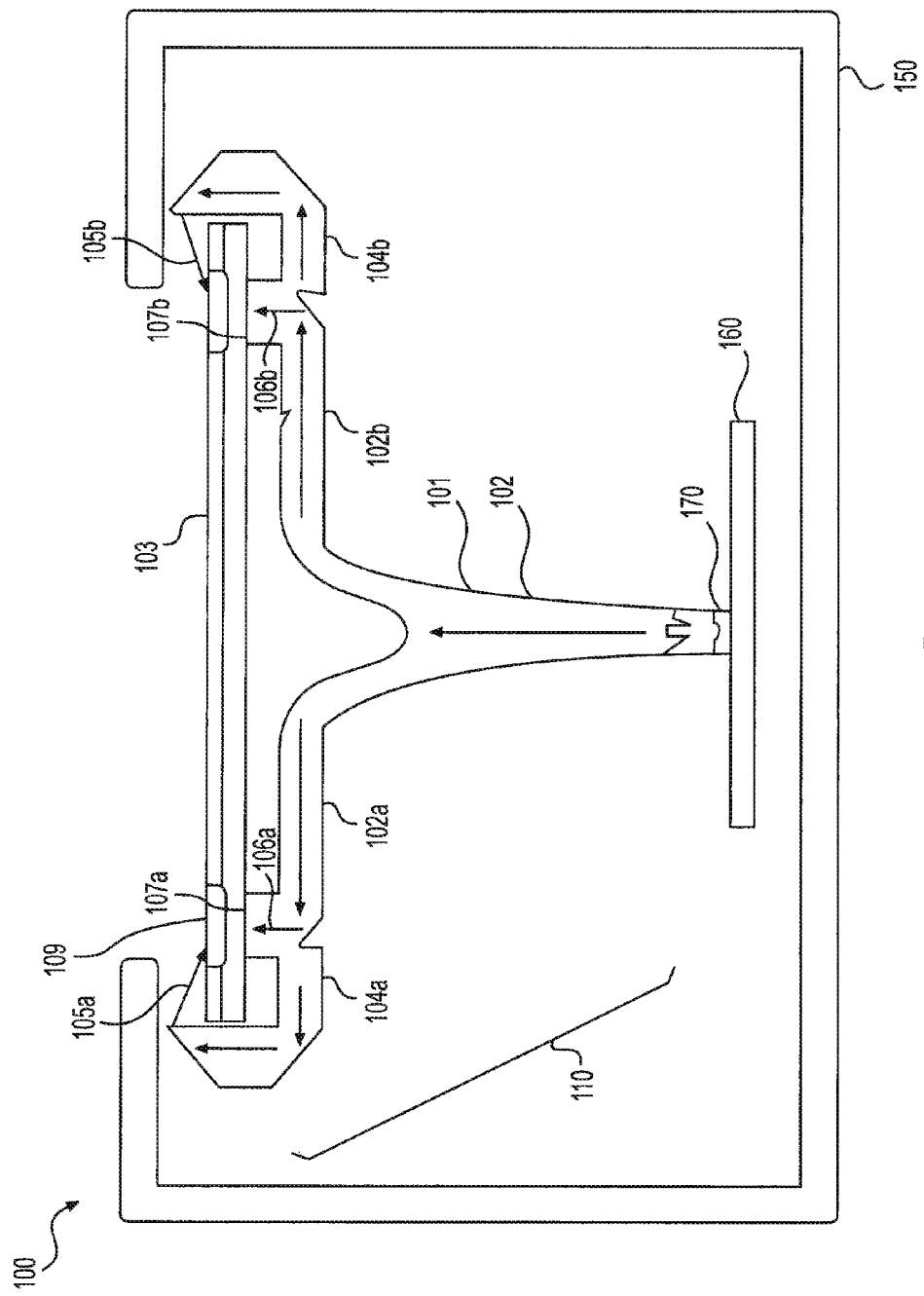
FIG. 1 illustrates an example of a gradient halo lighting assembly.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Electronic remote input devices are becoming more prevalent and employed in different situations and context. Mechanical displays, such as those commonly found in automobiles are being replaced by their electronic counterparts.

As explained in the Background section, the electronic remote input devices may be augmented with interactive features, such as touch capabilities. The touch capabilities allow a user to engage with an electronic system in an interactive manner. Thus, by placing a finger or operation on the touch portion of the electronic remote input device, the user may activate certain functions associated with the electronic system.

Certain effects and additions may be added to a remote input device based on a user or implementer's preference. Thus, by adding the effects or additions, the remote input device may be aesthetically pleasing to a viewer, or easier to locate. In turn, by being more aesthetically pleasing, the electronic system's sales may improve accordingly.

Disclosed herein is remote input device provided with a gradient light halo effect, and methods and systems for creating the same. By employing the aspects disclosed herein, a gradient light halo may be incorporated into existing or new electronic systems.

The gradient light halo may be viewed as a feature which improves the overall aesthetics of the electronic system. A gradient light halo is a layer of light that a viewer notices, but does not significantly alter the display associated with the remote input device. Implementations that employ a gradient light halo may be advantageous for a variety of functional and design reasons.

FIG. 1 illustrates an example of a gradient halo lighting assembly 100. The components employed in FIG. 1 are exemplary, and various modifications may be achieved by one of ordinary skill in the art.

The halo lighting assembly 100 includes a lighting portion 110, a case 150, a circuit board 160, and a LED 170. The circuit board 160 may be any sort of electronic device employed to drive light through LED 170. The circuit board 160 may be coupled to a control unit, or driver, and thereby ensure light via the LED 170 propagates to the lighting portion 110.

The LED 170 may be any sort of lighting technology, such as organic light emitting diodes (OLED), light emitting diodes (LED), liquid crystal displays (LCD), plasma screens, and the like. The LED 170 may be employed for backlighting of the lighting element 110.

The circuit board 160 controls the LED 170 to propagate light or waves of light via the light pipe 101. The light pipe 101 is a tubular device that allows light to propagate from one end to another (for example, a fiber optic cable, or the like). The light pipe 101 allows for light to permeate through its cavity and provide back lighting and flood lighting to the lighting element 110. The light generated from the LED 170 creates a ray trace 102 as light is propagated through the light pipe 101.

The ray trace 102 may separate into two distinct rays (102a and 102b) due to the divergence of the path created by splitting the light pipe 101. After which, ray traces 102a and 102b propagate to create ray traces 104a, 106a, and 104b and 106b, respectively.

Ray traces 104a and 104b each propagate out of an opening of light pipe 101 (opening 105a and 105b). The openings, 105a and 105b, scatter light in a way to provide a halo effect 109. As shown, the halo effect 109 is a bright addition of light on an edge area of a lens 103. The lens 103 will be discussed in further detail below.

The light pipe 101 also includes an opening 107a and 107b. Openings 107a and 107b provide a back lighting to the lens 103. The lens 103 may be modified with stipple patterns (which will be described in greater detail below). The introduction of openings 107a and 107b, along with the stipple patterns also aids in producing a gradient halo light pattern.

The lens 103 and lighting element 110 may be integrated with a display, such as a touch sensing device (or a remote input device). The remote input device, when touched or actuated may instigate an electronic signal indicating actuation.

Figure 2:
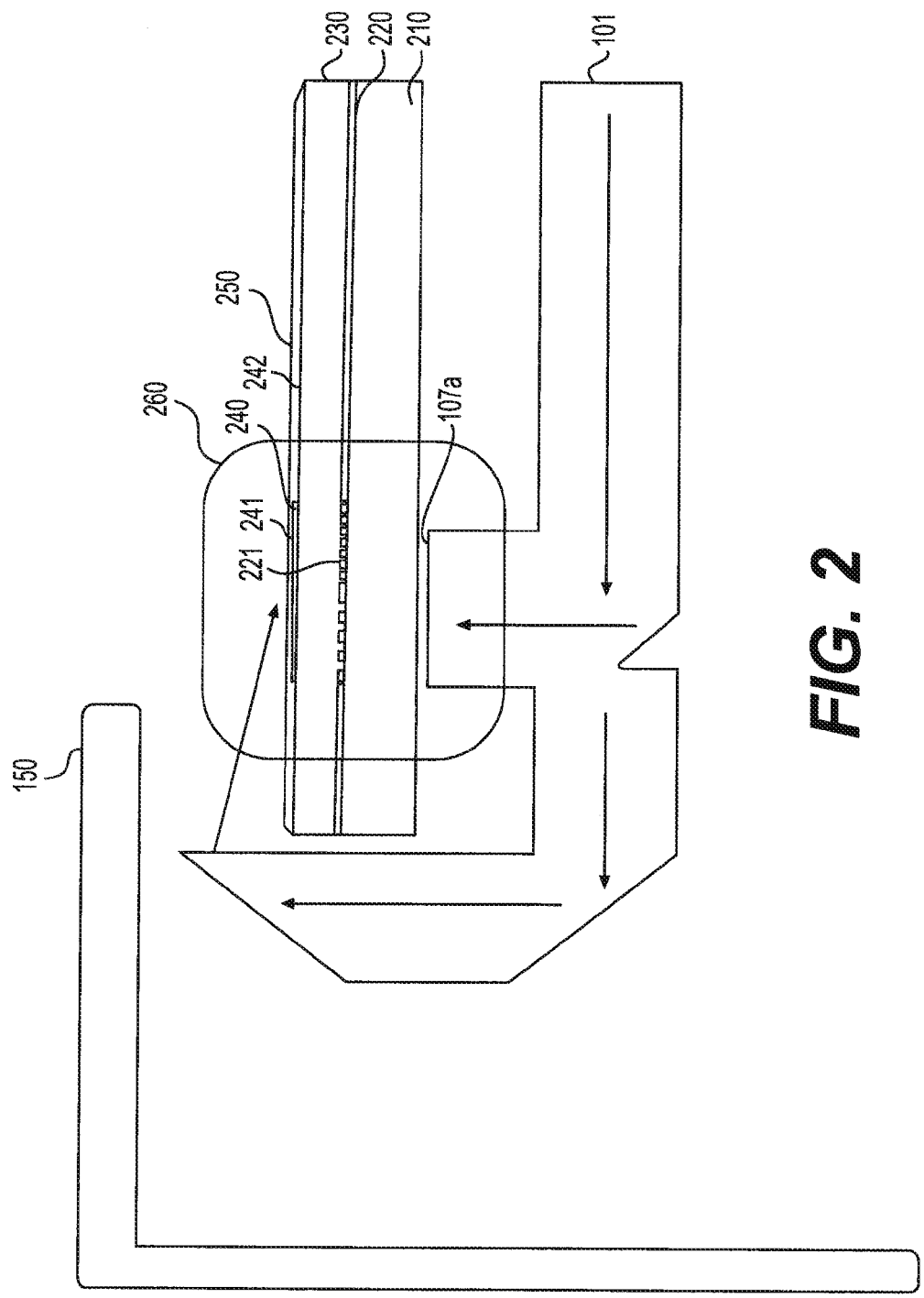
FIG. 2 illustrates an exploded view of an edge of a halo lighting area.

FIG. 2 illustrates an exploded view of an edge of a halo lighting area. The various layers of the lens 103 are shown in greater detail, and will be described more thoroughly. The view in FIG. 2 shows one side of a halo lighting assembly. One of ordinary skill in the art may duplicate the aspects disclosed herein on another side.

The light pipe 101 propagates a ray trace 102 to create ray trace 102a. Ray trace 102a is propagated through opening 107a (as ray trace 106a). As the light hits opening 107a, the light is sent through lens 103.

The first layer the light makes contact with is a plastic substrate 210. The plastic substrate 210 may be any transparent layer that allows light to go through. The plastic substrate 210 is an element in lens design for lighting, because the plastic substrate 210 is inexpensive, lightweight, and can be employed to fabricate certain lighting circuitry, such as an organic light emitting diode (OLED).

After passing through the plastic substrate 210, the light makes contact with an ink layer 220. The ink layer 220 substantially blocks the light on the portions the ink is applied to.

The ink layer 220 includes two separate portions: a stipple pattern 221 and a solid ink portion 222. The stipple pattern 221 substantially lines up with opening 107a. Thus, when light is projected out via opening 107a, the stippling (i.e. dotted applications of ink in a gradient), causes the light to be projected in a gradient like presentation.

An applique layer 230 is disposed on the ink layer 120. An applique layer 230 is any sort of transparent layer that allows ink to be applied onto. Due to the applique layer 230 being transparent (or substantially transparent), and thus allows light to pass through.

The blocking layer 240 is disposed on the applique layer 230. The blocking layer 240 may be composed of an ink portion 241 and a non-ink portion 242. The ink portion 241 is composed of a substance similar or the same as that employed for the ink layer 220 to produce the stippling pattern. The ink portion 241 may be substantially over an opening 107a, and be approximately or the same size of opening 107a.

A hard coat 250 may be disposed on the blocking layer 240, thereby providing a passivation layer on the overall surface. The hard coat 250 may be composed with a substantially transparent or glass-like layer, and thus, allows light to pass by.

Figure 3:
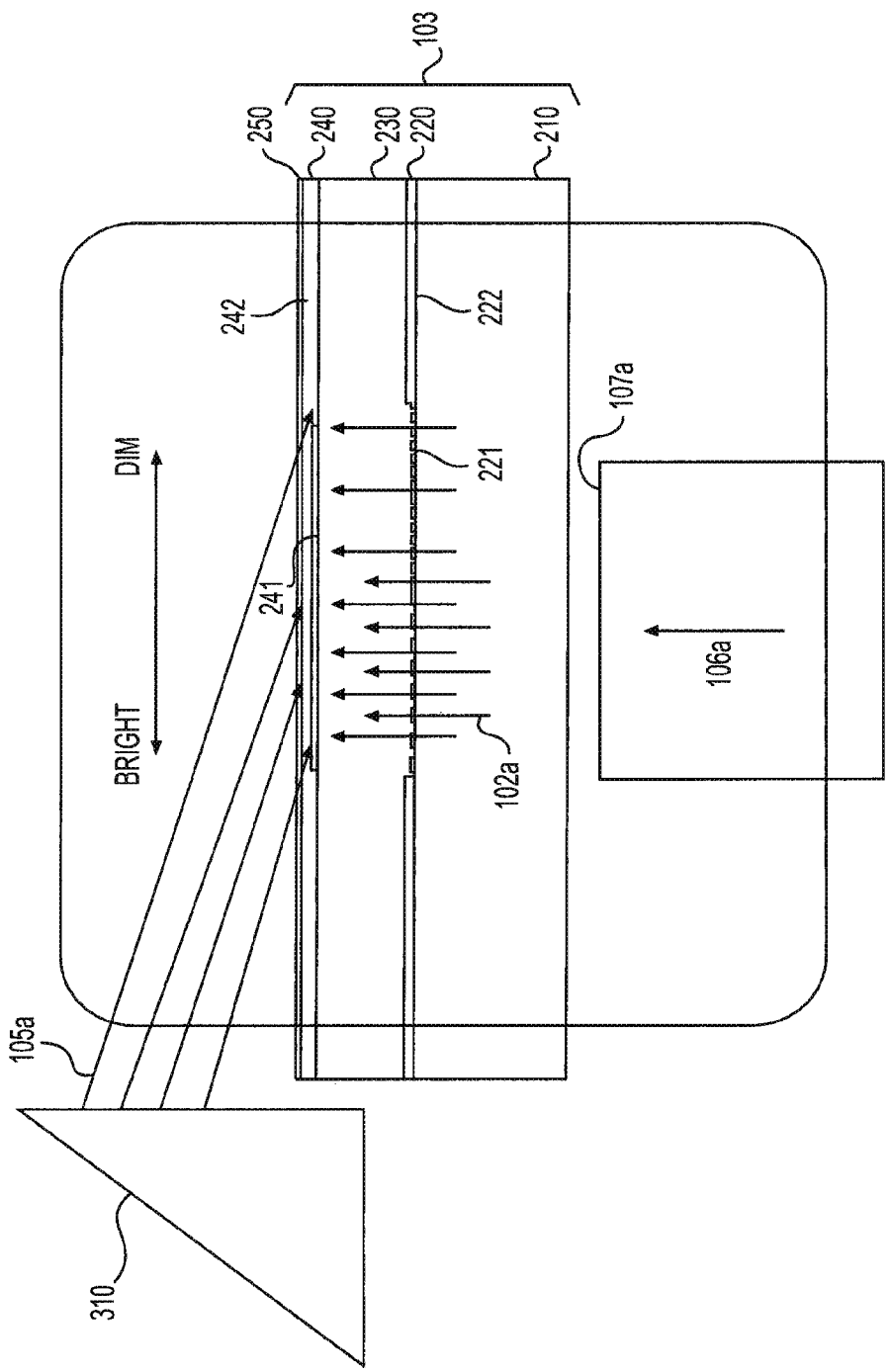
FIG. 3 illustrates an example implementation of the edge area of FIG. 2.

FIG. 3 illustrates an example implementation of the edge area of FIG. 2. The example shown in FIG. 3 is substantially similar to that shown in FIG. 2. However, the ray trace 102 is propagated through the light pipe 101, and effectively transferred to the lens 103.

Three distinct elements that effectuate the gradient halo effect are shown in FIG. 3. Light rays 105a from a flood light portion 310 are propagated onto a surface as shown. Further, the ink portion 241 allows the light rays 105a to bounce off of, thereby enhancing the effect caused by the flood light portion 310.

The blocking layer 220, propagates light rays 106a through the opening 107a, and dims the light rays 106a. The overall effect is to create a softened and gradient type of light.

Thus, the combination of the flood lighting, the surface to enhance the flood lighting, and the gradient back lighting provide an aesthetically pleasing lighting surface.

Figure 4:
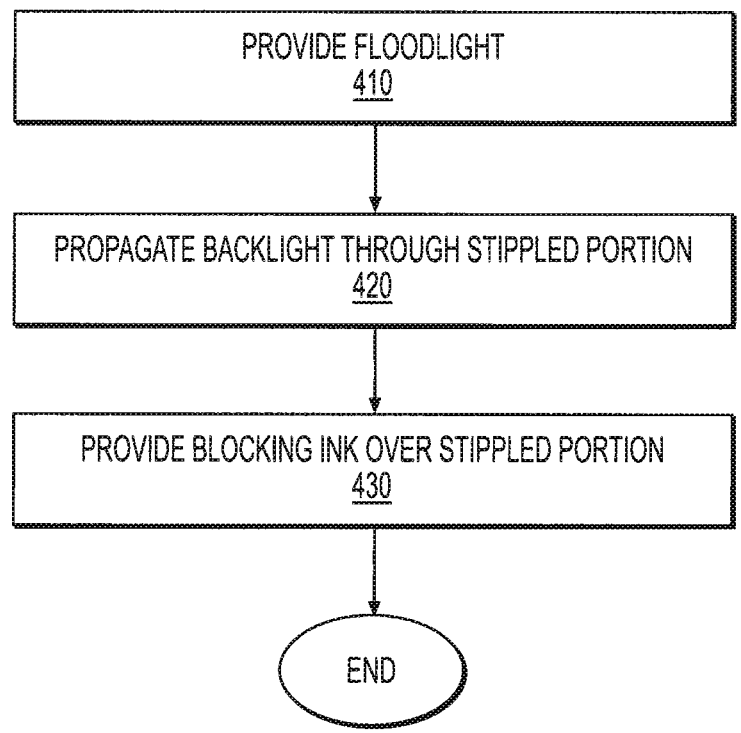
FIG. 4 illustrates a method for creating gradient halo light for a remote input device.

FIG. 4 illustrates a method 400 for creating gradient halo light for a remote input device. The remote input device may be any sort of touch sensitive input surface and electronic apparatus, that when touched, instigates a signal to be employed with an electronic system.

In operation 410, a floodlight is provided onto a surface of a lens. The floodlight may be provided via a light on an edge of the lens. The light may be sourced from a similar source as that which provides a back lighting for the remote input device.

In operation 420, a backlight is propagated through a stippled portion through an ink layer. The stippled portion serves to dim the backlight.

In operation 430, over the area stippled, on opposing an applique layer, a solid ink portion may be provided. The solid ink portion may significantly line up with the area in which the flood light is oriented towards.

Figure 5:
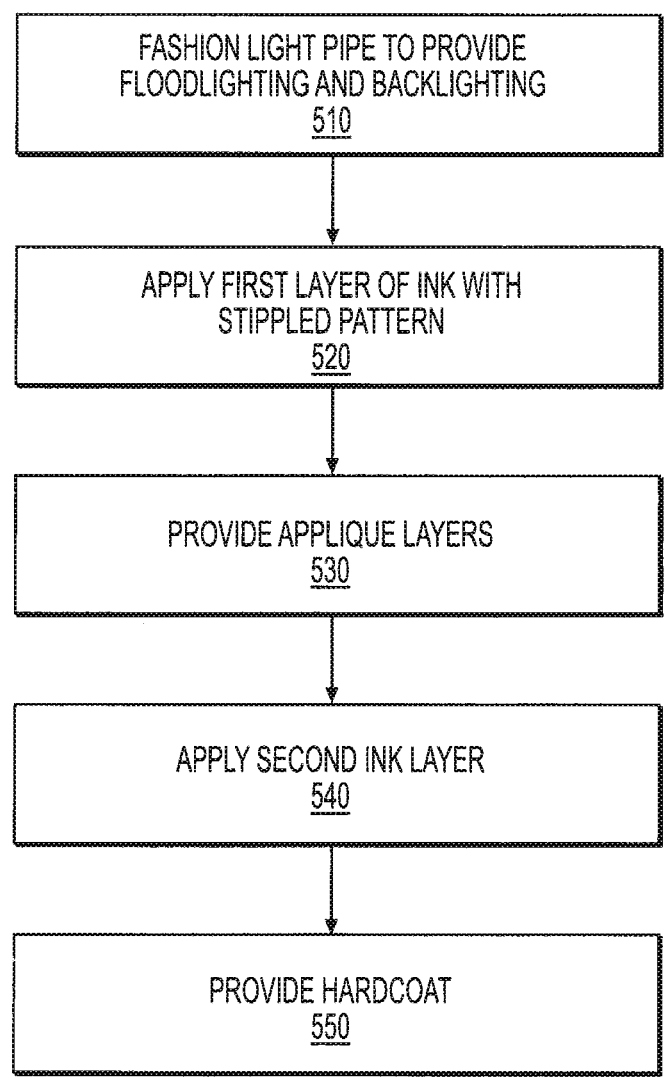
FIG. 5 illustrates an example of method 500 of manufacturing of an assembly for creating gradient halo lighting.

FIG. 5 illustrates an example of method 500 of manufacturing of an assembly for creating gradient halo lighting. The various operations discussed below may be implemented along with existing lighting technologies for the augmentations discussed herein.

In operation 510, a light pipe is fashioned to provide a backlight and floodlight. The light pipe may source light from a single source, and split into two portions (as shown in FIG. 1). The light may propagate through a first opening to provide light for backlighting purposes, and a second opening to provide light for floodlighting purposes.

In operation 520, a first layer of ink may be applied onto a plastic substrate. The ink may be applied in a fashion shown in FIG. 2, with stippling patterns substantially over an opening portion, and solid ink on a non-opening portion.

In operation 530, an applique layer may be provided. The applique layer. In operation 540, a second layer of ink may be applied. The layer of ink may substantially cover the opening portion, either exactly or a predetermined amount more or less than the opening area. The second layer of ink may be disposed as to serve as surface to reflect the propagated flood light. In operation 550, a hard coat may be placed onto the second layer of ink.

Employing the aspects disclosed herein, either the application itself, or the methods disclosed above, an implementer of a remote input device may provide a gradient halo lighting experience. The gradient halo lighting provides a simulated glow to remote input device's.

The aspects employed herein may be implemented as a whole, or alternatively, existing electronic systems (and specifically, input devices) may be augmented with the aspects described above.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A gradient light halo device, comprising:
    a backlight portion to project a backlight onto a first surface of a remote input device;
    a floodlight portion to project a floodlight onto a second surface of the remote input device, wherein the second surface opposes the first surface;
    an ink layer disposed on the first surface, the ink layer including a solid portion and a stippled portion; and
    a blocking layer disposed on the second surface, the blocking layer including a non-ink portion and an ink portion.

2. The device according to claim 1, wherein the backlight is propagated via an opening through the stippled portion.

3. The device according to claim 2, wherein the opening, the stippled portion, and the ink portion correspond to each other.

4. The device according to claim 1, wherein the floodlight portion propagates floodlight onto the ink portion.

5. The device according to claim 3, wherein the floodlight portion and backlight portion are connected via a light pipe.

6. The device according to claim 1, wherein the remote input device is a touchpad surface.

7. The device according to claim 5, further comprising a plastic substrate disposed between the light pipe and the ink layer.

8. The device according to claim 7, further comprising an applique layer disposed between the blocking layer and the ink layer.

9. The device according to claim 8, further comprising a hardcoat layer disposed on the blocking layer in the second surface.

10. A method for creating gradient halo light on remote input device, comprising:
    providing a floodlight onto a top surface of the remote input device;
    propagating a backlight through a stippled portion of a first side of a lens the remote input device; and
    providing an inked portion on a second side of the lens of the remote input device.

11. The method according to claim 10, wherein the inked portion substantially overlaps with the stippled portion.

12. The method according to claim 11, wherein the floodlight is propagated onto the inked portion.

13. The method according to claim 12, wherein the floodlight and backlight are provided from a singular source of lighting.

14. A method for manufacturing a gradient halo light assembly for a remote input device, comprising:
    fashioning a light pipe to provide floodlighting and backlight;
    applying a first layer of ink with a stippled pattern to receive the backlight;
    providing an applique layer; and
    applying a second layer of ink on an opposing side of the applique layer, the second including a solid portion and a non-solid portion.

* * * * *